(12) United States Patent
Semerdzhiev

(10) Patent No.: US 8,666,953 B2  
(45) Date of Patent: Mar. 4, 2014

(54) MULTI-LEVEL VERSION FORMAT

(75) Inventor: Krasimir P. Semerdzhiev, Sofia (BG)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/491,630

(22) Filed: Jun. 8, 2012

(65) Prior Publication Data

US 2012/0246131 A1  Sep. 27, 2012

Related U.S. Application Data

(62) Division of application No. 10/846,288, filed on May 14, 2004, now Pat. No. 8,229,906.

(51) Int. Cl.  
*G06F 17/30* (2006.01)

(52) U.S. Cl.  
USPC ............ 707/696; 707/695; 707/697; 707/758

(58) Field of Classification Search  
USPC .................................. 707/696, 697, 758, 695  
See application file for complete search history.

(56) References Cited

U.S. PATENT DOCUMENTS

| | | | | |
|---|---|---|---|---|
| 6,236,993 | B1* | 5/2001 | Fanberg | 707/690 |
| 7,089,552 | B2* | 8/2006 | Atallah | 717/175 |
| 7,373,613 | B2* | 5/2008 | Pohlan | 715/853 |
| 7,757,298 | B2* | 7/2010 | Shuster | 726/30 |
| 8,165,998 | B2* | 4/2012 | Semerdzhiev | 707/690 |
| 8,229,906 | B2* | 7/2012 | Semerdzhiev | 707/696 |
| 2004/0133544 | A1* | 7/2004 | Kiessig et al. | 707/1 |

* cited by examiner

*Primary Examiner* — Debbie Le

(57) ABSTRACT

A version file for maintaining version information is described herein. The version file comprises an identifier to identify a target collection of associated files and a target index specifying binary level contents of the target collection of associated files to compare with a reference index specifying contents of a reference collection of associated files. The version file farther comprises a checksum generated based on the identifier and the target index.

10 Claims, 11 Drawing Sheets

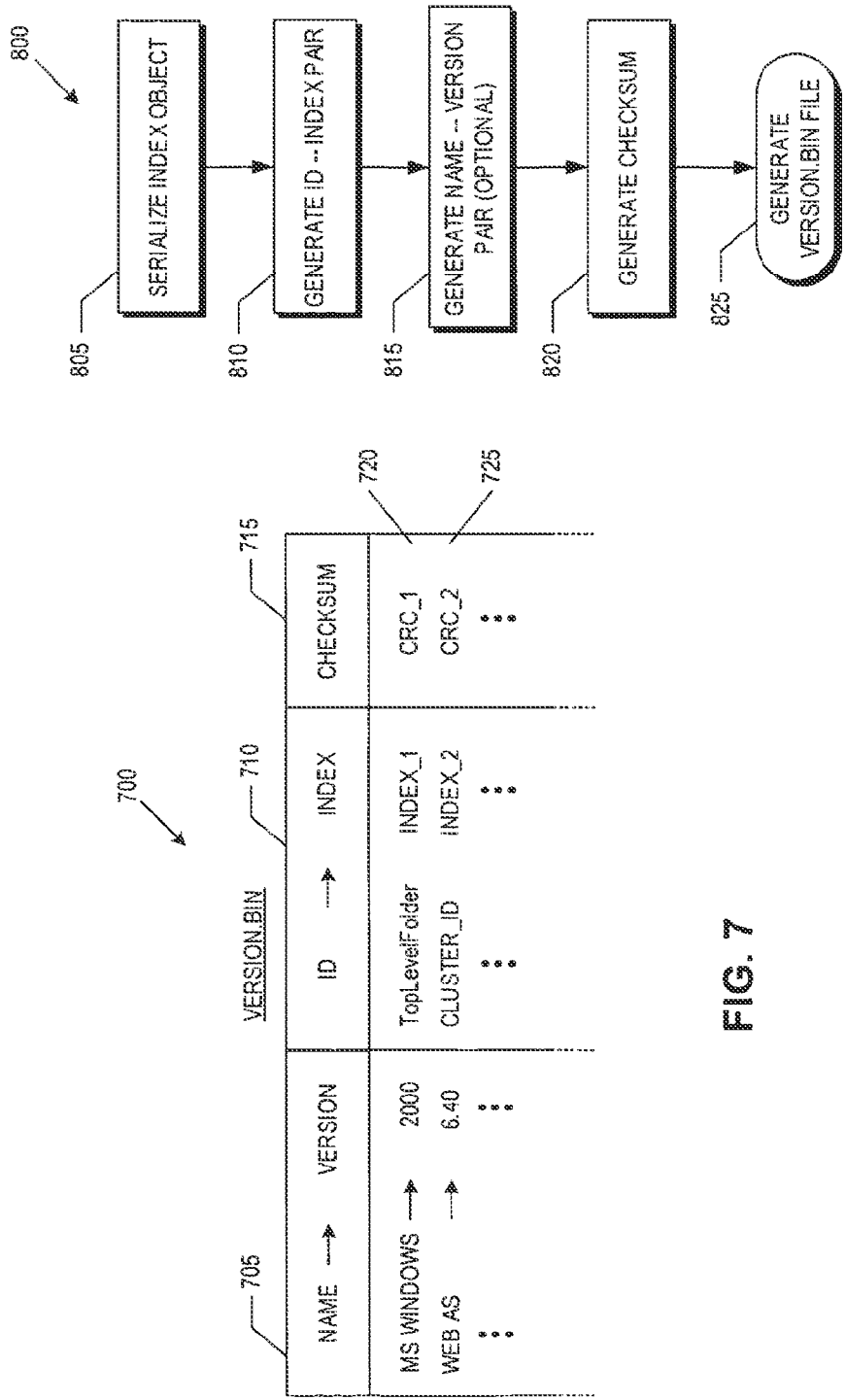

MULTI-LEVEL VERSION FORMAT

CROSS-REFERENCES TO RELATED APPLICATIONS

This application is a divisional application of U.S. patent application Ser. No. 10/846,288, filed May 14, 2004 now U.S. Pat. No. 8,229,906 which is incorporated herein by reference.

TECHNICAL FIELD

This disclosure relates generally to soft, are, and in particular but not exclusively, relates to a multi-level version format that specifies the contents of a collection of associated files and enables fast comparison with the associated files.

BACKGROUND INFORMATION

Typically, a software product is assigned a name-version pair to convey version information about the software product. In most cases, the version label is pre-defined, even before development of the software is completed. For example, Microsoft ("MS") Windows 2000™ represents a name—version pair, with "Microsoft Windows" representing the name of the software product and "2000" representing the version label conveying the version information about the software product.

FIG. 1 illustrates a representative System Properties dialog box that can be accessed from the Control Panel of a MS Windows operating system ("OS"). FIG. 1 illustrates that the current version of MS Windows installed is 2000. However, the System Properties dialog box provides further version information.

Large-scale software products, such as the MS Windows, usually consist of many modules that work together. Each module is developed separately, debugged separately, and often patched separately. A "service pack" is an example of a regularly issued patch by the Microsoft Corporation. FIG. 1 conveys additional version information to convey to a user that the instant MS Windows 2000 installation has been patched with Service Pack 4. The "5.00.2195" number also conveys specifics regarding the particular MS Windows 2000 installation.

However, patches are often issued outside of the regular service packs. These irregular patches are more difficult to track. Installation of third party software may modify a particular MS Windows installation in ways that current version labels are unable to track. To further compound the problem, users of a processing system may manually alter installation files in a multitude of manners that version labels simply cannot track.

One technique to determine changes to a software product, which version labels do not track, is to execute a file compare DOS command on a target file and a reference file. However, executing a file compare on a large file is a slow process that consumes considerable processor resources. Large-scale software products can contain hundreds, if not thousands, of individual files. Executing a file compare on each individual file to determine which files do not match is unrealistic. In networking environments with centralized databases, the reference file may be located on a centralized database remote from a client system containing the target file. In this scenario, executing a file compare could consume vast amounts of network bandwidth—particularly if many client systems need to compare their local target files against the remote reference file.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7 is a table illustrating a version file for storing one or more indexes containing version information, in accordance with an embodiment of the present invention.

FIG. 8 is a flow chart illustrating a process for generating a version file for maintaining version information about a tree-based directory, in accordance with an embodiment of the present invention.

DETAILED DESCRIPTION

Embodiments of a system and method for generating an index for maintaining version information of a target directory are described herein. Furthermore, embodiments for comparing the target directory against a reference directory to quickly determine whether the contents of the target directory match the contents of the reference directory are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places through out this specification are not necessarily all referring to the same embodiment. Furthermore, the particular features, structures, or characteristics may be combined in any suitable manner in one or more embodiments.

Figure 1:
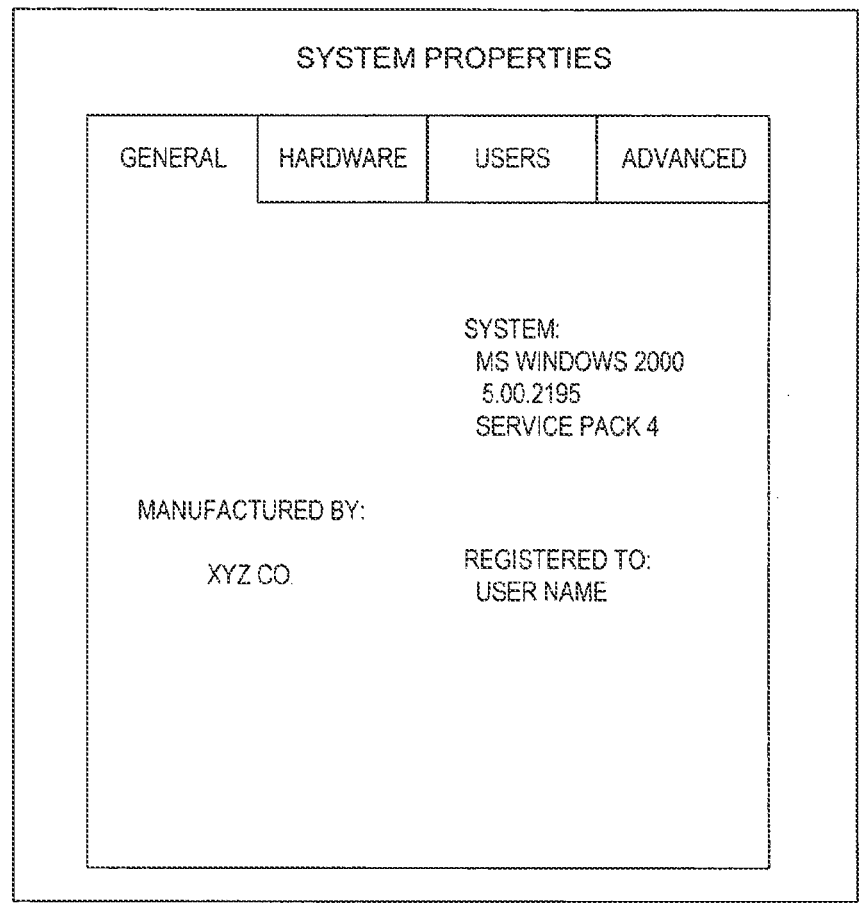
FIG. 1 illustrates a known technique for maintaining version information.
Figure 2:
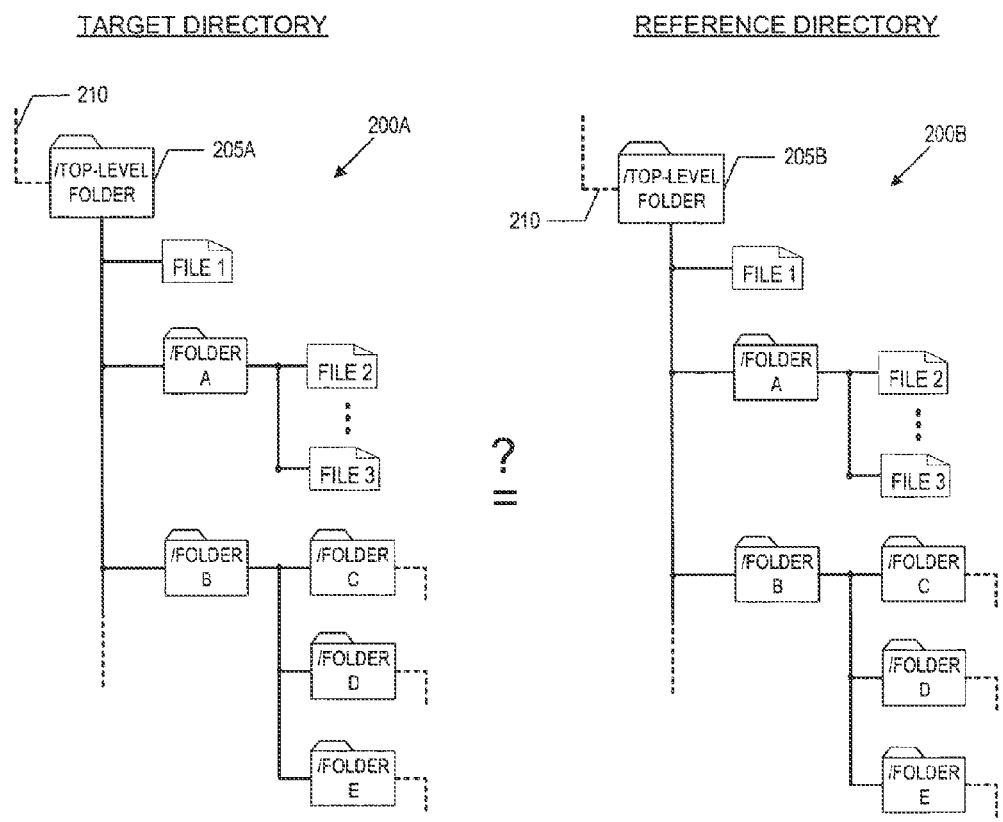
FIG. 2 illustrates a target directory from which an index containing version information may be generated and a reference directory for comparing against, in accordance with an embodiment of the present invention.

FIG. 2 illustrates a target directory 200A and a reference directory 200B for comparing target directory 200A against, in accordance with an embodiment of the present invention. In the illustrated embodiments, target directory 200A and reference directory 200B (collectively referred to as directories 200) are tree-based directories having top-level folders 205A and 205B (collectively referred to as top-level folders 205), respectively, multiple subfolders (e.g., folders A, B, C, D, and E) and files (e.g., files 1, 2, and 3). For the purposes of clarity and this discussion, directories 200 have been illustrated as tree-based structures; however, the techniques described herein are not limited to tree-based directories, but may be applied to any collection of associated files, Directories 200 may represent a collection of files and folders of a single software product or application, such as MS Windows™ 2000 or WebAS 6.40 developed by SAP AG of Waldorf, Germany.

Although directories 200 are illustrated as including two levels of subfolders below top-level folders 205, it should be appreciated that the techniques described herein are equally applicable to directories comprising any number of subfolders, even zero, having any configuration. As illustrated, some folders may include both files and subfolders (e.g., top-level folders 205), some folders may include only files (e.g., folders A), and some folders may include only subfolders (e.g., folders B). Furthermore, as illustrated by dashed lines 210, top-level folders 205 are the top-level folders of directories 200, but may themselves be subfolders of higher-level folders or a root folder further up the tree-like structure.

In short, embodiments of the present invention include techniques for uniquely describing the contents of target directory 200A, in one embodiment, an index is generated from target directory 200A that specifies the contents of target directory 200A at a binary level. A similar index may be generated based on the contents of reference directory 200B. Once both indexes have been generated, a quick comparison of the indexes will reveal whether all the contents of target directory 200A match all the contents of reference directory 200B. In one embodiment, the indexes are hierarchical structures including folder hashes at each folder level and file hashes of all the files within directories 200. Therefore, in one embodiment, the indexes may be iteratively compared at each file and folder level within the hierarchical structure to determine exactly which file or folders of target directory 200A do not exactly match the corresponding files and folders of reference directory 200B. Based on the comparison results, pinpoint updates may be selectively applied to the non-matching files and/or folders of target directory 200A without need to update the entire target directory 200A. Thus, the indexes provide a sort of version information about directories 200 that may be used when updating a software product. These and other embodiments are described in detail below.

Figure 3:
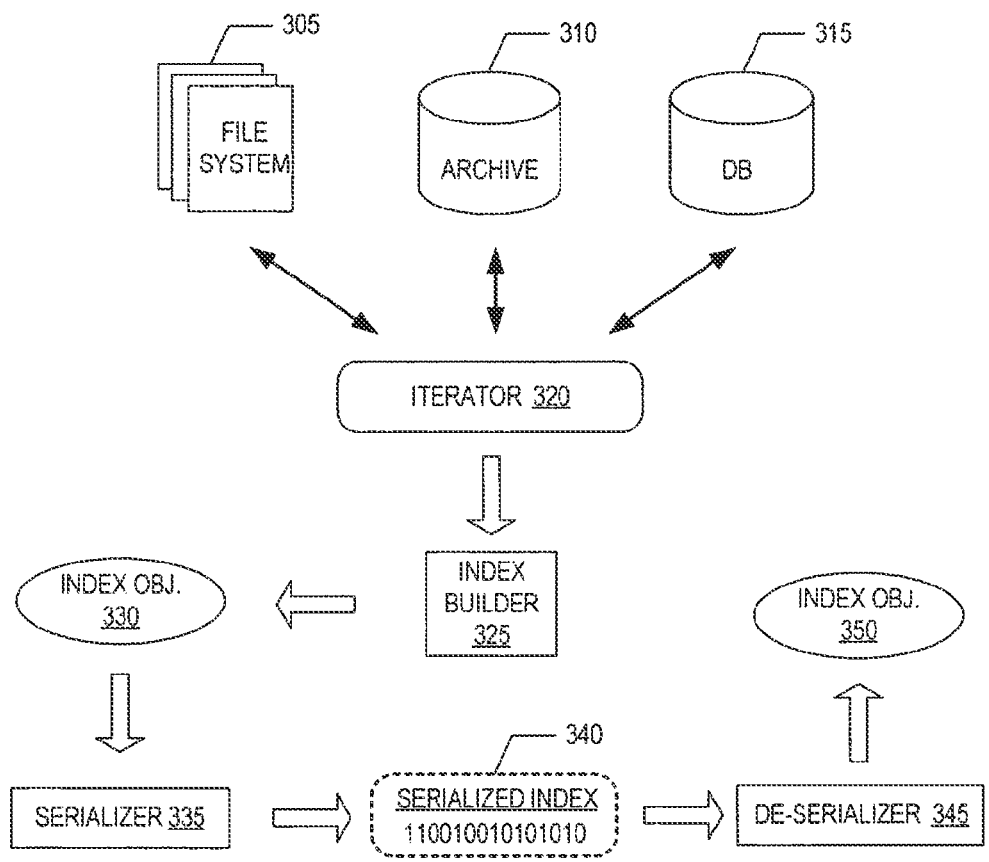
FIG. 3 is a data flow diagram illustrating a technique for generating a serialized index containing version information and for de-serializing the serialized index for comparing the version information, in accordance with an embodiment of the present invention.

FIG. 3 is a data flow diagram illustrating one technique for generating an index object and serializing the index object. As mentioned above, directories 200 may represent various different types of associated files or content. As such, an index may be generated based on different sources, including file systems 305, archive files 310 (e.g., zip files), and database files 315. File systems 305, archive files 310, and database files 315 represent different types or forms of collection of files and directories 200.

An index builder 325 builds an index object 330 with help of an iterator 320. At the request of index builder 325, iterator 320 walks through or parses the source, supplying index builder 325 with information about the source and its content to generate index object 330. Index object 330 uniquely describes the content and structure of the source (e.g., target directory 200A). For example, iterator 320 may supply index builder 325 with a list of all the filenames and the folder names within target directory 200A, which files and folders reside at a particular folder level, and the actual file contents themselves.

In one embodiment, a different iterator 320 is called by (or in object oriented language terms "raised by") index builder 325 depending upon the type of the source (e.g., file system 305, archive files 310, or database files 315). For example, index builder 325 may selectively call one of a FileSystemIterator, an ArchiveIterator, and a DatabaseIterator. In this embodiment, each instance type of iterator 320 has intimate knowledge of how to parse the particular source type and hand-up information to index builder 325. In an alternative embodiment, a single instance of iterator 320 is capable of extracting information from types of sources.

Figure 4:
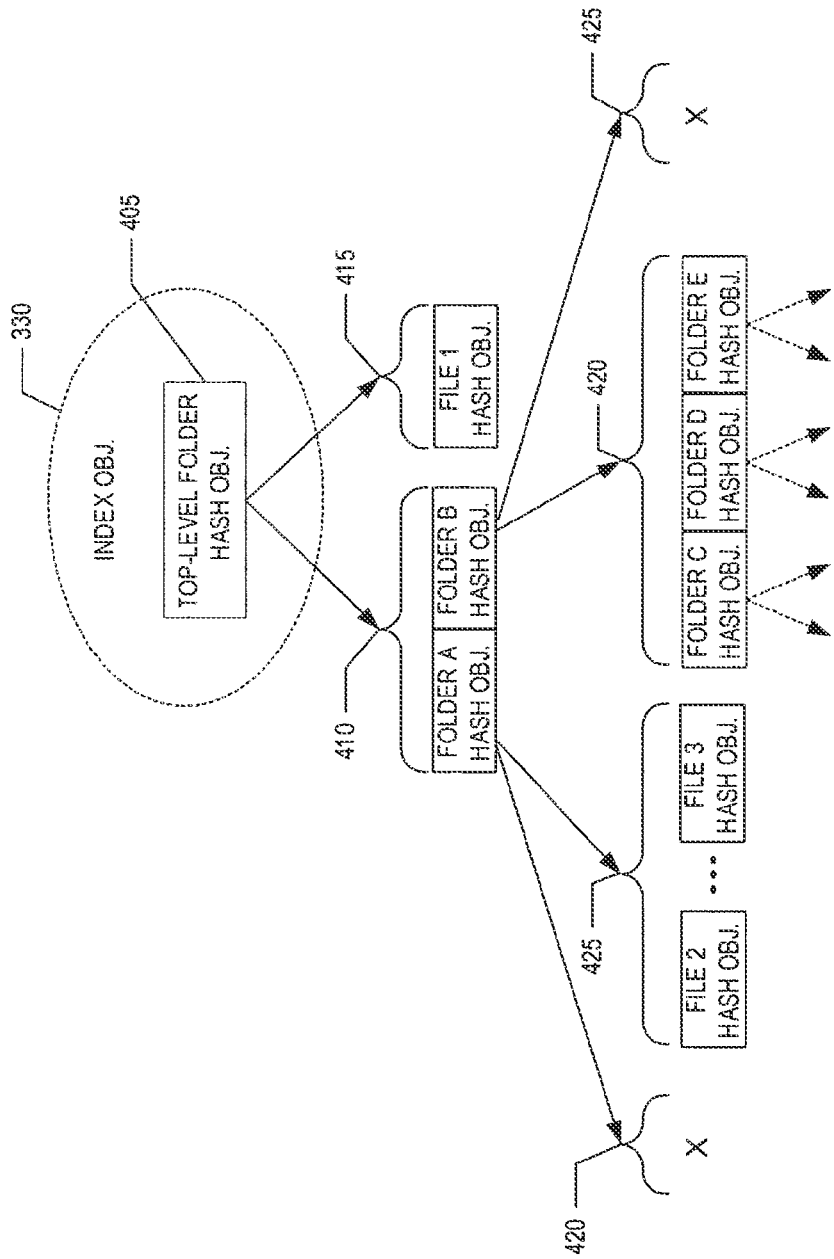
FIG. 4 illustrates an index object containing folder hash objects and file hash objects of a tree-based directory, in accordance with an embodiment of the present invention.

FIG. 4 illustrates one embodiment of index object 330 generated in accordance with the techniques described herein. In one embodiment, index object 330 generated by index builder 325 includes a single top-level folder hash object 405. Top-level folder hash object 405 includes a folder hash of top-level folder 205A. In turn, top-level folder hash object 405 includes a folder hash array 410 of folder hash objects (e.g., folder A hash obj., folder B hash obj.) and a file hash array 415 of file hash objects (e.g., file 1 hash obj.). Folder hash array 410 includes folder hash objects of all subfolders immediately within top-level folder 205A (e.g., folder A and folder B) and file hash array 415 includes file hash objects of all files immediately within top-level folder 205A (e.g., file 1). Similarly, each folder hash object within folder hash array 410 includes its own folder hash array 420 and file hash array 425. The imbedded nature of index object 330 continues on down the line until leaf level folders are reached. As is illustrated by the "X", some file hash arrays and folder hash arrays may be empty dependent upon the structure of target directory 200A.

In one embodiment, a file hash object, such as file 1 hash object, is an object which includes a hash value or hash total output from a hashing algorithm computed on the contents of a file. Generally, a hashing algorithm turns a variable-sized amount of input data (e.g., file 1) into a fixed-sized output—the hash value. There is a unique or statistically near unique relationship between the input data and the hash value, such that, the hash value uniquely or almost uniquely specifies the exact binary level contents of the input data (e.g., file 1). A change in the input data will almost certainly result in a change in the hash value, in this manner, a quick comparison of the hash values of two files will determine, with an extremely high statistical certainty, whether the two files are identical at the binary level.

A hash value may be a 16-byte binary number or even a fixed length alphanumeric value. Exemplary hashing algorithms, which may be implemented in connection with embodiments of the present invention, include but are not limited to, Message Digest 5 ("MD5"), MD4, Secure Hash Algorithm-1 ("SHA-1") or the like.

In one embodiment, a folder hash object (e.g., top-level folder hash object 405) is an object that includes a folder hash value computed based on a number of inputs representative of the particular folder. For example, the folder hash value contained within a folder hash object may be generated based on some or all of the following inputs: (1) the number of files within the folder, (2) the number of subfolders within the folder, (3), the name of each file within the folder, (4) the hash value of each file within the folder, (5) the name of each subfolder within the folder, (6) the folder hash values of each subfolder within the folder, and (7) the name of the current folder itself. If a folder hash value is computed at least in part based on the folder hash values of each subfolder within the current folder, then it should be appreciated that generating a folder hash value of top-level folder hash object 405 may be an iterative process starting at leaf folders and working out and up a tree-based directory, such as directories 200.

Figure 5:
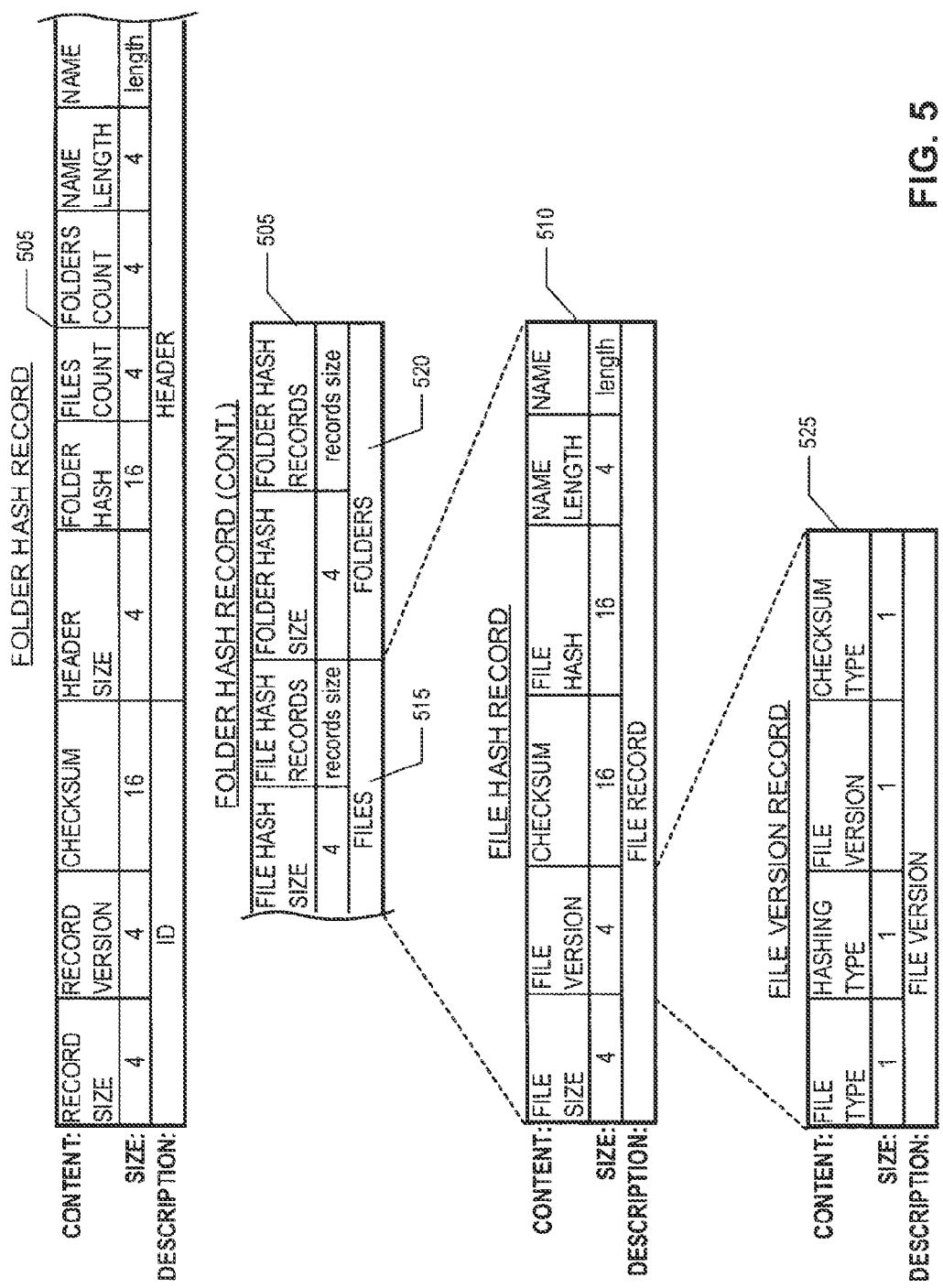
FIG. 5 illustrates a demonstrative folder hash record and file hash record for maintaining version information of a tree-based directory, in accordance with an embodiment of the present invention.

FIG. 5 illustrates a demonstrative folder hash record 505 and file hash record 510. As can be seen by FIG. 5, folder hash record 505 includes a field 515 for storing multiple file hash records 510. If the current folder for which folder hash record 505 represents has no files (e.g., folder B), then field 515 would be empty. The illustrated folder hash record 505 also includes a field 520 for storing folder hash values of subfolders. If the current folder for which folder hash record 505 represents has no subfolders (e.g., folder A), then field 520 would be empty. Finally, file hash record 510 may optionally include a file version record 525 specifying various information about a file hash value, including one or more of but not limited to, a file type, a hashing algorithm type (e.g., MD4, MD5, SHA-1, or the like), file version information, and a checksum type. It should be appreciated that folder hash record 505, file hash record 510, and file version record 525 are merely representative and various modifications or other types of folder hash records, file hash records, and optional file version records may be implemented in connection with embodiments of the present invention.

Returning to the data flow diagram of FIG. 3, once index builder 325 has generated index object 330, a serializer 335 turns index object 330 into a serialized index 340. Serialized index 340 may subsequently be inserted into a target version file (discussed more below) for conveying version information about target directory 200A. Furthermore, a similar serialized index generated based on reference directory 200B may inserted into a reference version file for comparison with the target reference file. Serializing index object 330 enables the version files to be conveniently communicated across a network for comparing directories on remote nodes of a network, while consuming little or negligible bandwidth.

In one embodiment, to compare the contents of target directory 200A with the contents of reference directory 200B, serialized index 340 is de-serialized by a de-serializer 345 and expanded back into an index object 350. Index object 350 should be substantially similar, if not identical to index object 330. A comparison between target directory 200A and reference directory 200B may include executing the data flow illustrated by FIG. 3 twice, once for target directory 200A and once for reference directory 200B. Alternatively, the contents of target directory 200A and reference directory 200B may be compared without serializing index object 330. Rather, index object 330 generated from each directory may be directly compared. This alternative technique may be advantageous when both target directory 200A and reference directory 200B are located on the same computing node (or server node).

The processes explained below are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like. The order in which some or all of the process blocks appear in each process should not be deemed limiting. Rather, one of ordinary skill in the art having the benefit of the present disclosure will understand that at least some of the process blocks may be executed in a variety of orders not illustrated.

Figure 6:
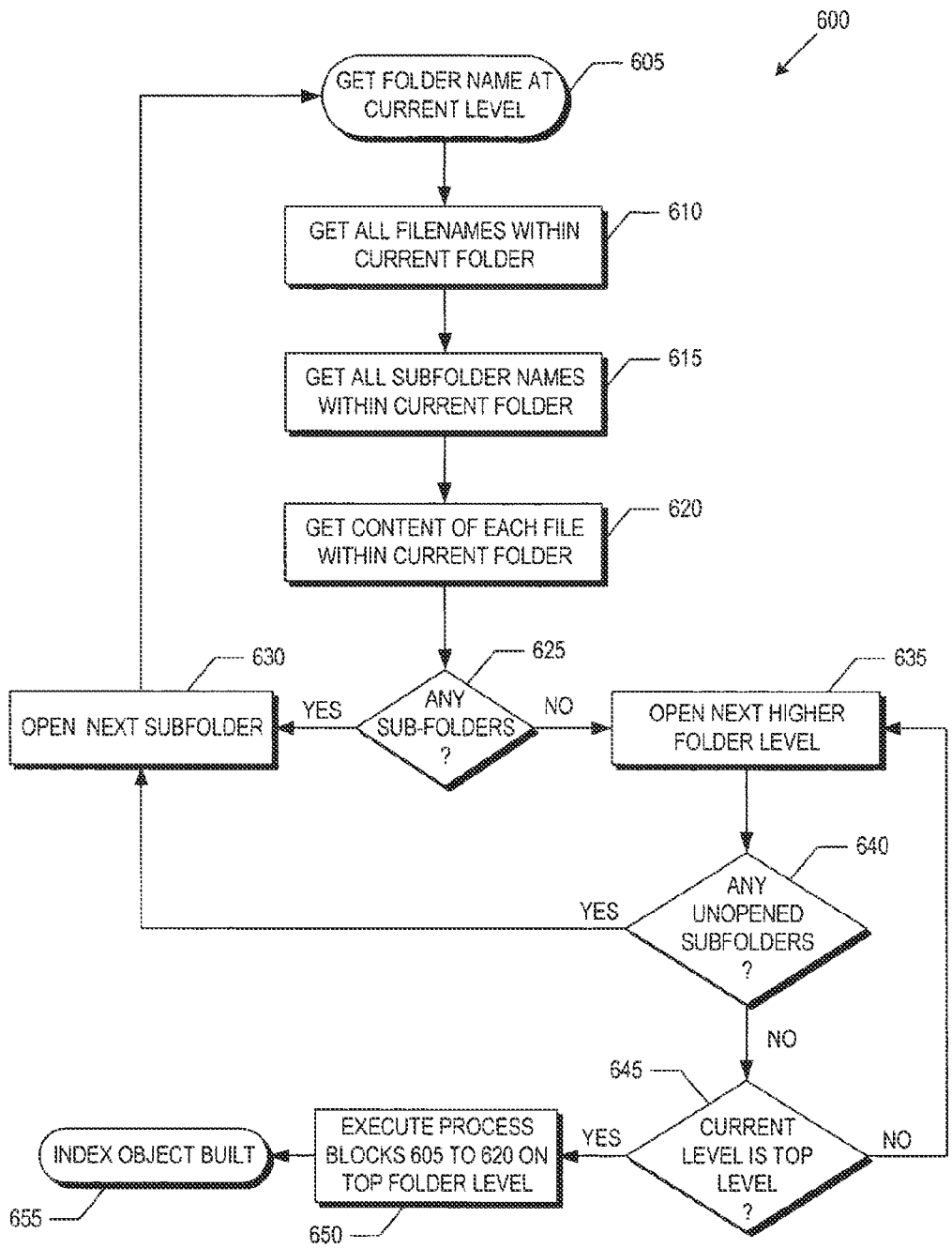
FIG. 6 is a flow chart illustrating a process for building an index object of a tree-based directory to maintain version information of the contents of the tree-based directory, in accordance with an embodiment of the present invention.

FIG. 6 is a flow chart illustrating a process 600 for building index object 330, in accordance with an embodiment of the present invention. Process 600 begins at a leaf folder level (e.g., folders A, C, D, or E) and works up and out to top-level folder 205A; however, process 600 may modified by one of ordinary skill in the art having the benefit of the instant disclose to begin elsewhere within target directory 200A, such as top-level folder 205A. It should be appreciated that process 600 is equally applicable for generating an index object for reference directory 200B.

In a process block 605, iterator 320 extracts the folder name at the current folder level and provides the folder name to index builder 325. For the purposes of this discussion, process 600 will begin at folder C. Therefore, at the beginning of process 600, iterator 320 would provide index builder 325 with the string "FOLDER C." In an alternative embodiment, aerator 320 may provide index builder 325 with the full pathname of the current level folder, which in this case may be "/TOP-LEVEL FOLDER/FOLDER 13/FOLDER C."

In a process block 610, iterator 320 extracts all filenames within the current folder level, if any, and provides the filenames to index builder 325, in the case of folder C, interator 320 would extract no filename strings, in a process block 615, iterator 320 extracts all subfolder names within the current folder level, if any, and provides the subfolder names to index builder 325. In the case of folder C, iterator 320 would extract no folder name strings. In a process block 620, iterator 320 provides the content of each file at the current folder level to index builder 325 to compute a file hash value thereon.

Once all subfolders and files at the current folder level have been iterated, process 600 continues to a decision block 625. If the current folder level contains subfolders, then one of the unopened subfolders is opened, in a process block 630, thereby becoming the current folder level. Process 600 then returns to process block 605 and continues therefrom as described above. If there are no subfolders (as is the case for a leaf folder such as folder C), then process 600 continues to a process block 635.

In process block 635, iterator 320 opens the next higher folder level (e.g., folder B). In a decision block 640, iterator 320 determines whether any unopened subfolders exist at the current folder level (now folder B). Since folders D and E have not yet been opened, process 600 continues to process block 630 where, for example, folder D is opened and becomes the current folder level. Process 600 then proceeds through process blocks 605 to 620 within folder D as discussed above. Since folder D contains no subfolders, the current folder level returns to folder B in process block 635, and folder E is the next folder level opened in process block 630 since it has not yet been opened (decision block 640). Upon the third loop through process blocks 605-620, decision block 625, and process block 635, process 600 will once again return to decision block 640. This time at decision block 640 it will be determined that folder B has no unopened subfolders and process 600 will proceed to a decision block 645.

In decision block 645, because folder B is not the top level, process 600 will return to process block 635, and open the next higher folder (e.g., top-level folder 205A) and subsequently explore folder A (process block 630). Eventually, process 600 will explore all branches and folders of target directory 200A working up to top-level folder 204A and return to decision block 645. At this point, the current level will be the top level and process 600 will proceed to a process block 650. In process block 650, the top level folder name, all file names, all subfolder names, and file content within top-level folder 205A are extracted by iterator 320 and provided to index builder 325. Once process blocks 605 to 620 are executed on top-level folder 205A, index object 330 is completed (process block 655).

FIG. 7 is a table illustrating a version file 700 for storing one or more indexes specifying the contents of a collection of associated files. In one embodiment version file 700 is a binary file labeled in FIG. 7 as "VERSION.BIN." Version file 700 includes a column 710 for storing one or more identifiers ("IDs") correlated to indexes. Each ID identifies a collection of associated files, such as the files 1, 2, and 3 of target directory 205A. Thus each row of version file 700 corresponds to a different directory, which in turn may be associated with different software products. An ID may be a string ID assigned to the collection of associated files qualitatively describing its contents. For example, an ID may be the folder name of the top-level folder of a directory containing the collection of associated files (e.g., "TOP LEVEL FOLDER"), a cluster identifier of a cluster of nodes on a network each containing a portion of a distributed application, other sensible IDs, or even numeric IDs. In one embodiment, the indexes of column 710 are serialized indexes, such as serialized index 340.

Version file 700 may optionally include a column 705 including name—version pairs. The name—version pairs provide user-friendly version information. While the ID—index pairs provide definitive identification and version information, the indexes are intended to be read by a computer for comparing a target index against a reference index, as opposed to read by a human. As such, providing traditional name—version information makes version file 700 readable at a glance by a user.

Finally, version file 700 may also include a column 715 for storing checksums of the contents in columns 705 and 710. In one embodiment, each checksum may include any error checking technique, such as cyclical redundancy checking ("CRC"), executed upon its corresponding row. Thus, CRC.sub.—1 is a checksum of row 720 and CRC.sub.—2 is a checksum of row 725. Inserting column 715 with checksums of each row within version file 700 enables fast comparison between a target version file and a reference version file to determine which collection of associate files need updating. The checksums also provide a mechanism to ensure the version file has not been corrupted, if for example the version file was communicated over a network. Additionally, an overall checksum for the entire version file 700 may be generated to provide reliability and a fast comparison of all collections of associated files identified within version file 700.

FIG. 8 is a flow chart of a process 800 for generating version file 700, in accordance with an embodiment of the present invention. In a process block 805, index object 330 is serialized. Index object 330 is serialized by serializer 335. In a Java language embodiment, serializer 335 may be a method (e.g., writeobject( )) called by an object to serialize the index object 330. In a process block 810, the ID—index pair is generated using serialized index 340. In an optional process block 815, the name—version pair corresponding to the ID—index pair is generated. In one embodiment, the name—version pair is generated by extracting pre-existing name and version information from the collection of associated files (e.g., directory 200A). In a process block 820, a checksum is generated on one or both of the ID—index and name—version pairs. Finally, in a process block 825, version file 700 is generated and column 705 is populated with the name—version pair, column 710 populated with the ID—index pair, and column 715 populated with the checksum. Process 800 may be repeated for each row within version file 700. Additionally, process block 820 may further include generating a checksum for the overall version file 700.

Figure 9:
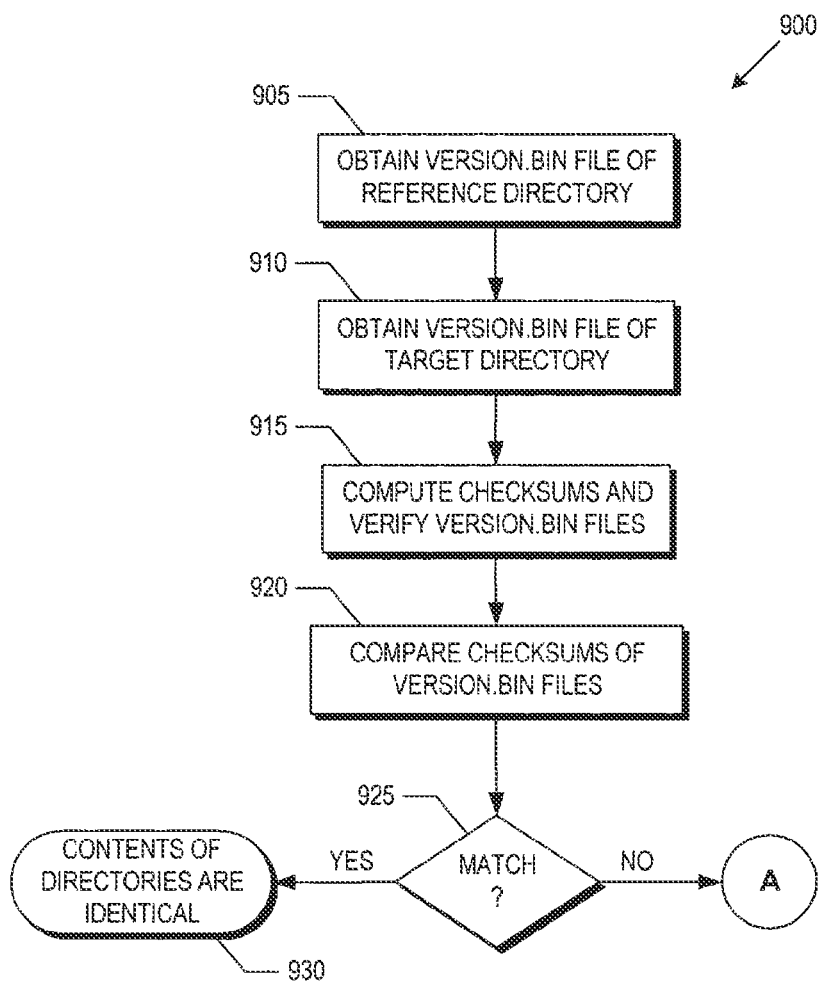
FIG. 9 is a flow chart illustrating a process for quickly determining whether all the contents of a target directory match all the contents of a reference directory using version files, in accordance with an embodiment of the present invention.

FIG. 9 is a flow chart illustrating a process 900 for quickly and efficiently determining whether all contents of target directory 200A match all contents of reference directory 200B, in accordance with an embodiment of the present invention. In process blocks 905 and 910, the version files of reference directory 200B and target directory 200A are obtained, respectively. Both version files may be stored locally or one may be stored on a remote node and therefore require accessing a network to retrieve.

In a process block 915, new checksums of each version file are individually computed and verified against the checksums stored in column 715 of version file 700. Verification of the checksums ensures the version files have not become corrupted, particularly if one of the version files was retrieved from a remote node across a network. In one embodiment, only the checksums of the version file retrieved from a remote node are verified. In one embodiment, only a single checksum for the entire version file is verified, as opposed to each checksum of column 715.

In a process block 920, the checksums of the target version file are compared against the checksums of the reference version file. If the checksums match (decision block 925), then the contents of each target directory 200A corresponding to each row within version file 700, are determined to be identical to each reference directory 200B (process block 930). It should be appreciated that a match determined in decision block 925 is equivalent to a determination that the binary level contents of target directory 200A are identical to the binary level contents of reference directory 200B. If the checksums do not match, then process 800 continues to an off-page reference A.

Any difference between target directory 200A and reference directory 200B will be exposed in process block 920. Thus, even if directories 200 represent files of an equivalent version of a software product, such as MS Windows™ 2000, having identical patch histories, if a user of target directory 200A accidentally (or intentionally) deletes/modifies even a non-crucial file, the change will be exposed. Thus, embodiments of the present invention provide a rigorous technique for determining whether target directory 200A has deviated from or is non-matching to reference directory 200B, whether or not the deviation is small or large.

Figure 10:
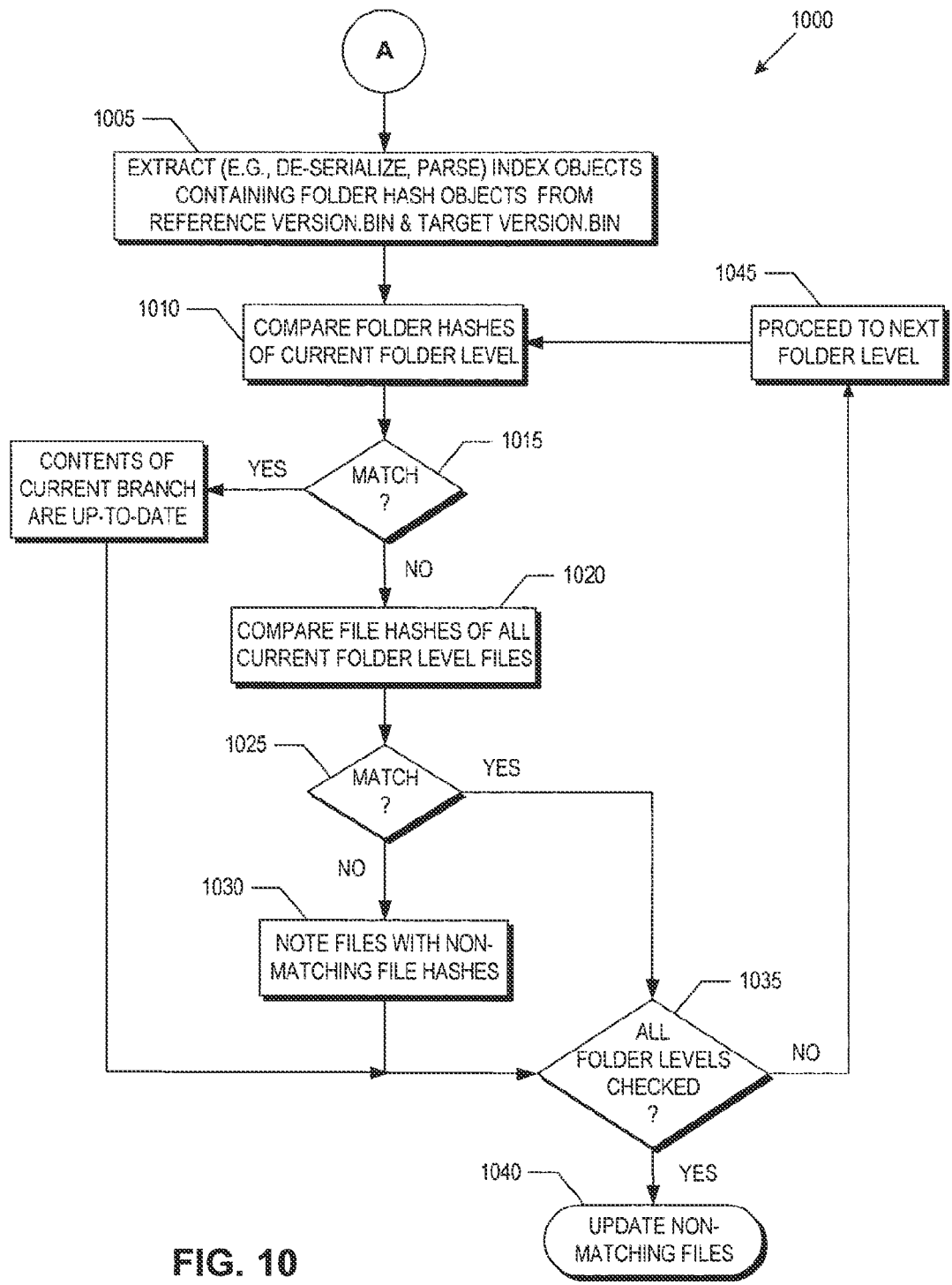
FIG. 10 is a flow chart illustrating a process for quickly determining and updating contents of a target directory not matching a reference directory, in accordance with an embodiment of the present invention.

FIG. 10 is a flow chart illustrating a process 1000 for quickly determining and updating contents of target directory 200A not matching contents of reference directory 200B, in accordance with an embodiment of the present invention. Process 1000 continues from process 900 at off-page reference A.

In a process block 1005, index objects 330 are extracted from each of the reference version file and the target version file. In one embodiment, extracting index objects 330 includes de-serializing serialized index 340 using de-serializer 345. In a process block 1010, folder hashes of the current folder levels of both version files are compared. For the first loop through process 1000, the current folder level is top-level folders 205. If the folder hash values do not match (decision block 1015), then process 1000 continues to a process block 1020. In process block 1020, all file hashes at the current folder level are compared, if one or more of the file hash values of target directory 200A at the current folder level do not match the corresponding file hash values of reference directory 200B (decision block 1025), then the non-matching files are noted in a process block 1030 for subsequent updating. If all file hash values at the current folder level match (decision block 1025), then process 1000 continues to a decision block 1035.

In decision block 1035 it is determined whether any folder levels remain unchecked. If folder levels have been checked, then the non-matching files (and folders) are updated in a process block 1040. However, if other folder levels still remain unchecked, then process 1000 proceeds to the next unchecked folder level (process block 1045) and returns to process block 1010 to proceed therefrom as described above. Process 1000 will loop until all folder levels have been verified.

Returning to decision block 1015, if a folder hash value of target directory 200A is determined to match its corresponding folder hash value of reference directory 200B, then all contents within the current folder level and all subfolders within the current folder level will be deemed matching. Such a match is referred to as a "branch match." A single comparison that results in a branch match is sufficient to verify an entire branch of the tree-based directory. For example, if the folder hash values of folders B compare as a match, then it is not necessary to compare folder hash values of folders C, D, and E, nor is it necessary to compare any file hash values of files that might reside in these subfolders.

Accordingly, embodiments of the present invention provide a fast and efficient technique for comparing and determining which content of a tree-based directory needs to be updated. Even in the worst-case scenario where all files have changed, the techniques described herein are more efficient than the prior art technique-file compare. Embodiments of the present invention compare a single hash value per file, relative to a file compare, which uses one comparison per byte of data.

Figure 11:
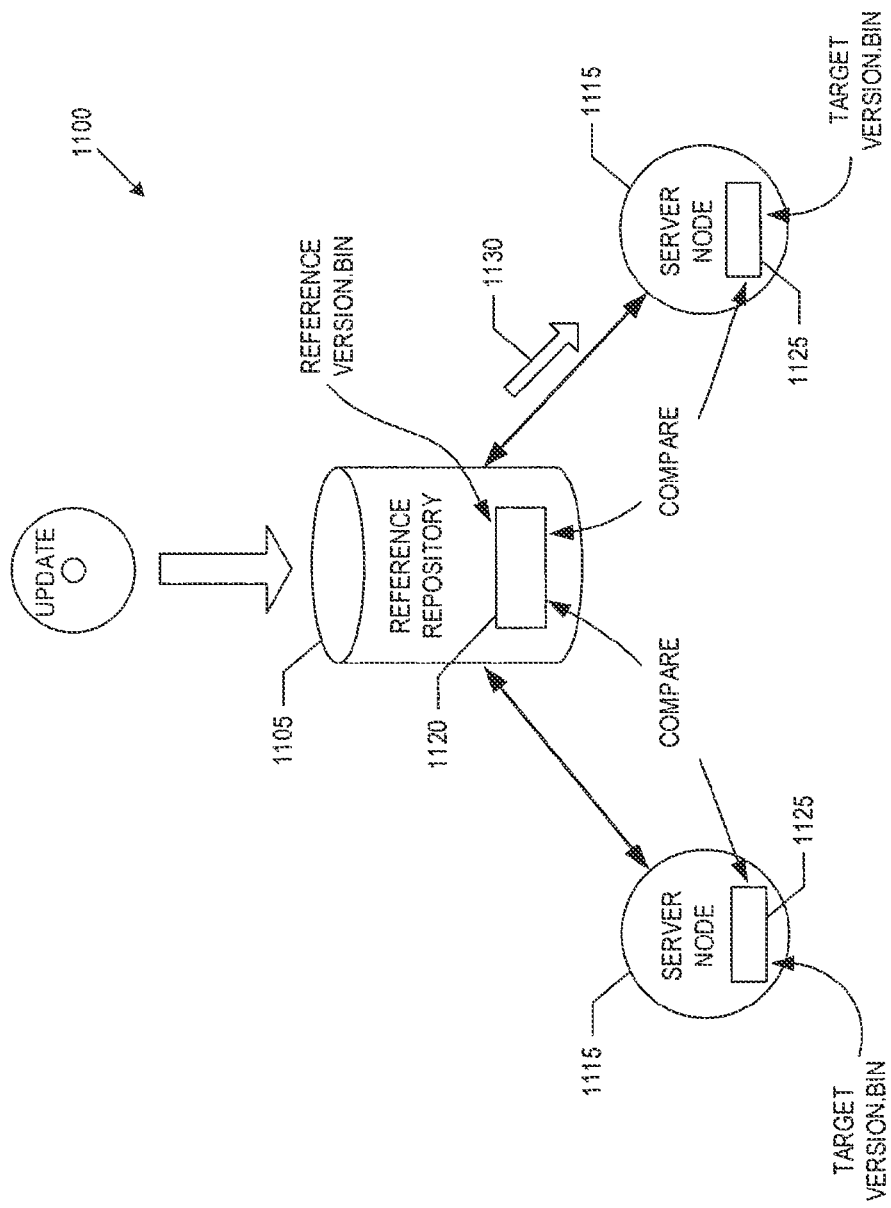
FIG. 11 illustrates an exemplary system for using version files to maintain server nodes up-to-date, in accordance with an embodiment of the present invention.

FIG. 11 illustrates an exemplary system 1100 for using version files 700 to maintain server nodes up-to-date and to determine exactly what version of software products exist on a particular server node. System 1100 may represent an enterprise system, such as a distributed Web Application Server (e.g., Java based WebAS, a .NET framework, or the like) or any system having a centralized repository for providing updates to remote nodes.

The illustrated system 1100 includes a reference repository 1105 (e.g., database node) communicatively coupled to a plurality of server nodes 1115. In one embodiment, reference directory 200B is stored on reference repository 1105. When an update is applied to the reference directory 200B, a reference version file 1120 may be generated. Subsequently, target version files 1125 stored on each server node 1115 are compared against reference version file 1120. If one or more of server nodes 1115 is determined to have non-matching directory structures, then update files 1130 may be transferred to the noncompliant server node 1115. A copy of reference version file 1120 may be transferred to each server node 1115 and the comparison executed on the server nodes 1115, or each server node 1115 may transfer its target version file 1125 to reference repository 1105 and the comparison executed on reference repository 1105.

Comparisons may be executed each time an update is applied to reference directory 200B stored on reference repository 1105, at set intervals to ensure server nodes 1115 do not change or destabilize over time, randomly during low network utilization, at an administrator's prompting, or otherwise.

Figure 12:
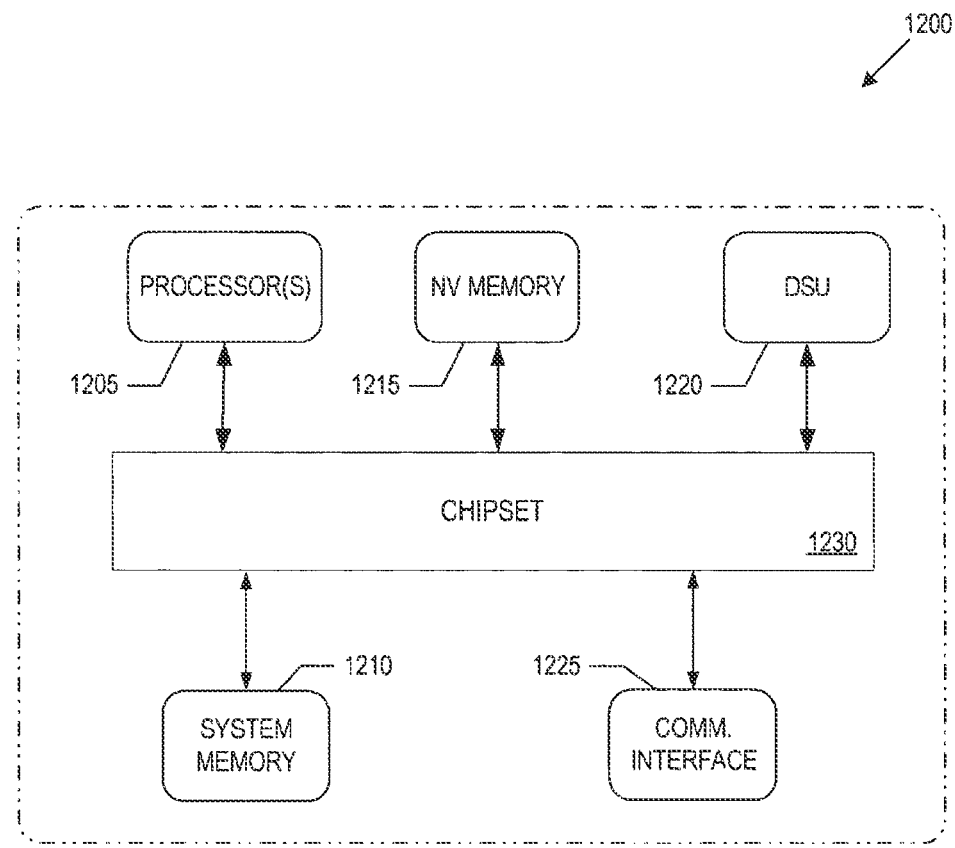
FIG. 12 is a block diagram of a demonstrative processing system for implementing embodiments of the present invention.

FIG. 12 is a block diagram illustrating a processing system 1200 for implementing embodiments of the presenting invention described herein. The illustrated embodiment of processing system 1200 includes one or more processors (or central processing units) 1205, system memory 1210, nonvolatile ("NV") memory 1215, a data storage unit ("DSU") 1220, a communication interface 1225, and a chipset 1230. The illustrated processing system 1200 may represent any computing system including a client computer, a desktop computer, a notebook computer, a workstation, a handheld computer, a server (e.g., server nodes 1115), a blade server, a database (e.g., reference repository 1105) and the like.

The elements of processing system 1200 are interconnected as follows. Processor(s) 1205 is communicatively coupled to system memory 1210, NV memory 1215, DSU 1220, and communication interface 1225, via chipset 1230 to send and to receive instructions or data thereto/therefrom. In one embodiment, NV memory 1215 is a flash memory device. In other embodiments, NV memory 1215 includes any one of read only memory ("ROM"), programmable ROM, erasable programmable ROM, electrically erasable programmable ROM, or the like. In one embodiment, system memory 1210 includes random access memory ("RAM"), DSU 1220 represents any storage device for software data, applications, and/or operating systems, but will most typically be a nonvolatile storage device. DSU 1220 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1220 is illustrated as internal to processing system 1200, DSU 1220 may be externally coupled to processing system 1200. Communication interface 1225 may couple processing system 1200 to a network such that processing system 1200 may communicate over the network with one or more other computers. Communication interface 1225 may include a modem, an Ethernet card, Universal Serial Bus ("USB") port, a wireless network interface card, or the like.

It should be appreciated that various other elements of processing system 1200 have been excluded from FIG. 12 and this discussion for the purposes of clarity. For example, processing system 1200 may further include a graphics card, additional DSUs, other persistent data storage devices (e.g., tape drive), and the like. Chipset 1230 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1230. Correspondingly, processing system 1200 may operate without one or more of the elements illustrated.

The above description of illustrated embodiments of the invention, including what is described in the Abstract, is not intended to be exhaustive or to limit the invention to the precise forms disclosed. While specific embodiments of and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A non-transitory computer-readable storage medium storing a version file, wherein the version file comprises:
    an identifier to identify a target collection of associated files comprising a tree-based directory;
    a target index specifying binary level contents of the target collection of associated files to compare with a reference index specifying contents of a reference collection of associated files, wherein the target index includes file hash values of files within the tree-based directory and folder hash values of folders within the tree-based directory generated based on hashes of the files and folders within a corresponding one of the folders; and
    a checksum generated based on the identifier and the target index.

2. The computer-readable storage medium of claim 1, wherein the version file further comprising:
    name-version information including name of a software product and a version label of the software product.

3. The computer-readable storage medium of claim 2, wherein the checksum is generated based on the name-version information.

4. The computer-readable storage medium of claim 1, wherein the target index is a serialized index containing version information.

5. A non-transitory computer-readable storage medium storing a version file, wherein the version file comprises:
    an identifier to identify a target collection of associated files comprising a tree-based directory; and
    a target index specifying binary level contents of the target collection of associated files to compare with a reference index specifying contents of a reference collection of associated files, wherein the target index includes file hash values of files within the tree-based directory and folder hash values of folders within the tree-based directory generated based on hashes of the files and folders within a corresponding one of the folders.

6. The computer-readable storage medium of claim 5, wherein the version file further comprising:
    name-version information; and
    a checksum generated based on the name-version information, wherein the name-version information includes name of a software product and a version label of the software product.

7. The computer-readable storage medium of claim 6, wherein the checksum is generated based on the identifier, and the target index.

8. The computer-readable storage medium of claim 5, wherein the target index is a serialized index containing version information.

9. A non-transitory computer-readable storage medium storing a version file, wherein the version file comprises:
    an identifier to identify a target collection of associated files comprising a tree-based directory;
    a target index specifying binary level contents of the target collection of associated files to compare with a reference index specifying contents of a reference collection of associated files, wherein the target index includes file hash values of files within the tree-based directory and folder hash values of folders within the tree-based directory generated based on hashes of the files and folders within a corresponding one of the folders;
    name-version information including name of a software product and a version label of the software product; and
    a checksum generated based on the name-version information, the identifier, and the target index.

10. The computer-readable storage medium of claim 9, wherein the target index is a serialized index containing version information.

* * * * *